United States Patent
Garg et al.

(10) Patent No.: US 7,430,628 B2
(45) Date of Patent: Sep. 30, 2008

(54) SYSTEM AND METHOD FOR OPTIMIZED ALLOCATION OF SHARED PROCESSING RESOURCES

(75) Inventors: Man Mohan Garg, Cerritos, CA (US); Alok Mathur, Lake Forest, CA (US)

(73) Assignees: Kabushiki Kaisha Toshiba (JP); Toshiba Tec Kabushiki Kaisha, JPX ( * ) Notice: Subject to any disclaimer, the term of this patent is extended or adjusted under 35 U.S.C. 154(b) by 44 days.

(21) Appl. No.: 11/328,937

(22) Filed: Jan. 10, 2006

(65) Prior Publication Data

US 2007/0162673 A1     Jul. 12, 2007

(51) Int. Cl.
*G06F 12/00* (2006.01)

(52) U.S. Cl. ........................ 710/200; 715/210
(58) Field of Classification Search ........... 370/401; 710/200; 715/210
See application file for complete search history.

(56) References Cited

U.S. PATENT DOCUMENTS

| | | | |
|---|---|---|---|
| 5,668,942 A | 9/1997 | Fromherz | |
| 5,771,339 A | 6/1998 | Fromherz | |
| 5,781,710 A | 7/1998 | Fromherz et al. | |
| 6,498,656 B1 | 12/2002 | Mastie et al. | |
| 6,501,559 B1 | 12/2002 | Salgado et al. | |
| 6,504,621 B1 | 1/2003 | Salgado | |
| 6,570,670 B1 | 5/2003 | Salgado et al. | |
| 6,583,888 B1 | 6/2003 | Salgado et al. | |
| 6,614,542 B1 | 9/2003 | Salgado et al. | |
| 6,651,081 B1 | 11/2003 | Salgado et al. | |
| 6,671,065 B1 | 12/2003 | Salgado et al. | |
| 6,717,690 B1 | 4/2004 | Salgado et al. | |
| 6,762,857 B1 | 7/2004 | Salgado et al. | |
| 2002/0016803 A1 | 2/2002 | Ryan et al. | |
| 2003/0099237 A1* | 5/2003 | Mitra et al. | 370/393 |
| 2003/0184798 A1 | 10/2003 | Enomoto et al. | |
| 2005/0068557 A1 | 3/2005 | Patton et al. | |
| 2005/0068571 A1 | 3/2005 | Hart et al. | |
| 2005/0094200 A1 | 5/2005 | Uekusa et al. | |
| 2005/0111026 A1 | 5/2005 | Kaneko | |
| 2005/0275860 A1 | 12/2005 | Nagarajan et al. | |
| 2007/0076728 A1* | 4/2007 | Rieger et al. | 370/401 |

* cited by examiner

*Primary Examiner*—Clifford H Knoll
(74) *Attorney, Agent, or Firm*—Tucker Ellis & West LLP

(57) ABSTRACT

A system and method which efficiently manages the status of resources or services in a document processing system or device and uses a priority-based dynamic allocation process for allocating or releasing selected resources for a user or task. A job resource manager receives resource requests containing a resource name, quantity and order of use. The resource manager then determines if the request meets predetermined parameters, so as to lock the designated resource for use by the job with which the request is associated. The resource is then released for use by the job and remains inaccessible to other jobs until unlocked. The resource is unlocked by the job resource manager upon receipt of notification that the job has been completed.

14 Claims, 4 Drawing Sheets

SYSTEM AND METHOD FOR OPTIMIZED ALLOCATION OF SHARED PROCESSING RESOURCES

BACKGROUND OF THE INVENTION

This invention is directed to a system and method for allocation of shared processing resources. In particular, this invention is directed to a system and method for allocating a plurality of resources for a document processing operation or task. The system and method of the present invention efficiently manages the status of resources or services in a document processing system or device and uses a priority-based dynamic allocation process for allocating or releasing selected resources for a user or task.

Document processing systems or devices typically contain many services or resources available to users. Such resources include document processing services, such as printing, faxing, copying, and scanning, electronic document transmittal services, such as electronic mail, and document finishing operations, such as stapling and hole punching. One method of allocating resources is locking or restricting the use of all resources required by the requestor from being accessed by other users before confirming the availability of the requested resources to the requestor. This method ensures that all the requested resources are locked and only available to the requestor. However, all of the requested resources must be available for use before any of the resources are released for use by the requestor. The requestor may not use an available resource prior to all of the resources being available.

Another method of allocating resources is to release the resources as they become available to the requestor. This method allows the requestor to start using the available resources rather than waiting until all the requested resources are available for release to the requestor. One problem with this method, however, is that the requestor is not notified as to when the remaining resources will be available. The requestor may desire assurances that the remaining requested resourced will be available within a specified time before the requestor commences any of the processing with the available resources. Therefore, there is a need for an improved system and method for allocation of shared processing resources.

The subject invention overcomes the above-noted problems and provides a system and method for the optimized allocation of shared processing resources.

SUMMARY OF THE INVENTION

In accordance with the present invention, there is provided a system and method for allocation of shared processing resources.

Further, in accordance with the present invention, there is provided a system and method allocating a plurality of resources for a document processing operation or task.

Still further, in accordance with the present invention, there is provided a system and method which efficiently manages the status of resources or services in a document processing system or device and uses a priority-based dynamic allocation process for allocating or releasing selected resources for a user or task.

Still further, in accordance with the present invention, there is provided a system for allocation of shared processing resources. The system comprises means adapted for receiving resource request data. The resource request data includes resource identifier data and resource quantity data. In addition, the system comprises means adapted for receiving resource usage data representative of relative usage order associated with a plurality of processing resources. The system also comprises monitoring means adapted for generating status data representative of present and future status of the plurality of processing resources. The system includes comparison means adapted for generating comparison data representative of a comparison of received request data with status data via comparison means. The system also includes resource release means for selectively releasing resources corresponding to received resource request data in accordance with the comparison data.

Still further, in accordance with the present invention, there is provided a method for allocation of shared processing resources. The method of the present invention receives resource request data, wherein the resource request data including resource identifier data and resource quantity data. The method further receives resource usage data representative of relative usage order associated with a plurality of processing resources. The method also generates status data representative of present and future status of the plurality of processing resources. The method further generates comparison data representative of a comparison of received request data with status data and then selectively releases resources corresponding to received resource request data in accordance with the comparison data.

Still other objects and aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

This invention is directed to a system and method for allocation of shared processing resources. More particularly, this invention is directed to a system and method which efficiently manages the status of resources or services in a document processing system or device and uses a priority-based dynamic allocation process for allocating or releasing selected resources for a user or task. Preferably, the document processing system or device is an image generating device, such as a multifunctional peripheral device, capable of providing scanning, copying, facsimile, printing, document management, document storage, electronic mail, and other functions to a user.

Figure 1:
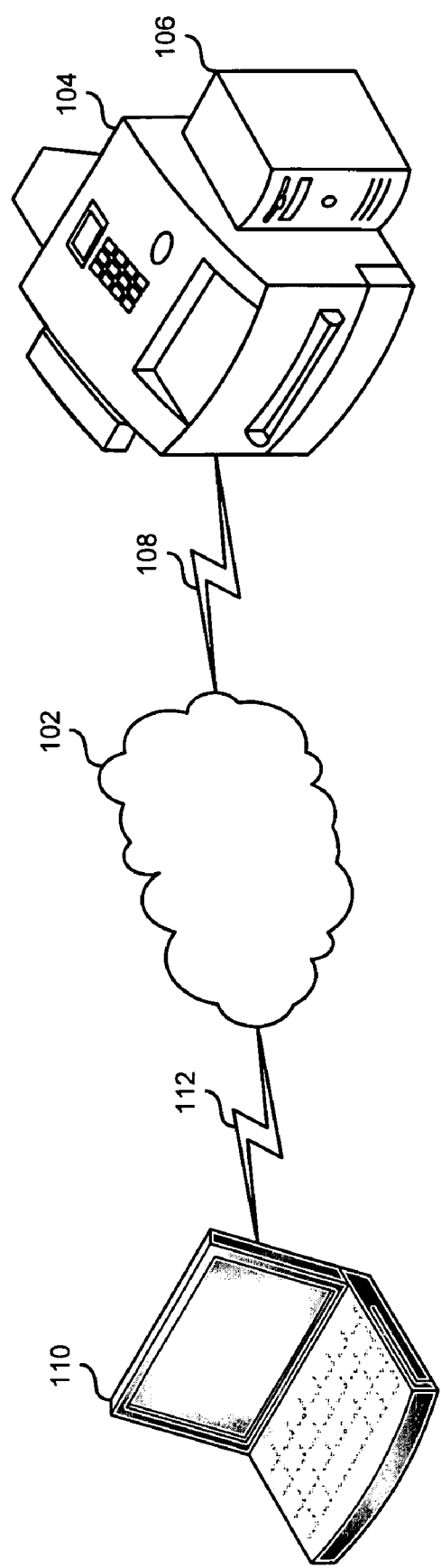
FIG. 1 is a block diagram of the system according to the present invention.

Referring now to FIG. 1, there is shown a block diagram illustrating a system 100 in accordance with the present invention. It will be appreciated by those skilled in the art that the system 100 is for example purposes only, and other implementations in accordance with the subject invention are equally capable of being employed. The system 100 includes a distributed environment, illustrated in FIG. 1 as a computer network 102. It is to be appreciated by those skilled in the art that the subject invention is not limited to application over the computer network 102, but rather is capable of allocation of processing resources solely integral to the device or system in which the invention is applied. As will be understood by those skilled in the art, the computer network 102 is any distributed computing environment known in the art and capable of enabling the exchange of data, voice, or other communications between two or more electronic devices. Suitable computer networks include, for example and without limitation, the Internet, a wide area network, a local area network, a personal area network, or any combination thereof.

The system 100 further includes a document processing device 104 communicatively coupled to the computer network 102, via a suitable communications link 108. It will be appreciated by those skilled in the art the document processing device 104 is advantageously represented in FIG. 1 as a multifunction peripheral device, suitably adapted to provide a variety of document processing services, such as, for example and without limitation, scanning, copying, facsimile, printing, and the like. Suitable commercially available image generating devices include, but are not limited to, the Toshiba e-Studio Series Controller. In one embodiment, the document processing device 104 is suitably equipped to receive a plurality of portable storage media, including without limitation, Firewire drives, USB drives, SD, MMC, XD, Compact Flash, Memory Stick, and the like. The communications link 108 is any suitable channel of data communications known in the art including, but not limited to wireless communications, for example and without limitation, Bluetooth, WiMax, 802.11a, 802.11b, 802.11g, 802.11(x), infrared, optical, or any suitable wireless data transmission system, or wired communications known in the art. In the one embodiment of the present invention, the document processing device 104 further includes a user-interface, such as, a touch-screen user-interface, however any other suitable means of user interaction, such as an alphanumeric keypad, mouse, LCD, or any combination thereof, are equally capable of being employed to receive instructions from the user.

The document processing device 104 further includes a controller 106, suitably adapted to facilitate the implementation of the present invention. As will be understood by those skilled in the art, the controller 106 is any hardware, software, or combination thereof, communicatively coupled to the document processing device 104 and capable of providing document processing command and control for the document processing device 104. In the preferred embodiment, the controller 106 is integrated within the document processing device 104. More preferably, the controller 106 is suitably adapted to receive and manage client requests for access to and use of system resources. Those skilled in the art will appreciate that suitable system resources include, but are not limited to, document processing operations, electronic document transmission operations, and document finishing operations. The skilled artisan will appreciate that document processing operations include, for example and without limitation, simplex printing, duplex printing, scanning, copying, gamma correction, and the like, electronic document transmission operations include, for example and without limitation, facsimile processing, electronic mail processing, storage operations, and the like, and document finishing operations include, for example and without limitation, stapling, three-hole punching, collating, and the like.

The system 100 also includes at least one client device, illustrated in FIG. 1 as a laptop computer 110. It will be appreciated by those skilled in the art that the present invention is not limited to a single client device, but rather is capable of allowing any number of client devices, to be used in accordance with the present invention. The client device 110 is suitably equipped to communicate with the computer network 102 via the communications link 112. As will be understood by those skilled in the art, the communications link 112 is representative of a plurality of communications channels which the client device 110 is capable of using to exchange data with the network 102. Thus, for example and without limitation, the communications link 112 is any wired or wireless data communications channel known in the art, such as Bluetooth, WiMax, 802.11a, 802.11b, 802.11g, 802.11(x), infrared, optical, and the like. It will further be appreciated by those skilled in the art that the client device 110 is suitably any personal electronic device known in the art capable of interacting with the computer network 102 and the document processing device 104. For example and without limitation, suitable client devices include a smart phone, a personal data assistant, a desktop computer, a web-enabled cellular communications device, and the like.

In operation, a client device 110 transmits a document processing job to the document processing device 104 via the computer network 102. It will be understood by those skilled in the art that a user of the client device 110 is equally capable of initiating a document processing job directly via a user interface associated with the document processing device 104. It will further be understood by the skilled artisan that the client device 110 is suitably capable of communicating directly with the document processing device 104, via a USB, Firewire, parallel, wireless, serial, or other direct link, so as to submit a job for document processing. The job, or task, is received by the controller 106 of the document processing device 104 via any suitable means. In the preferred embodiment, the controller 106 includes a job resource manager component. As will be understood by those skilled in the art, the job resource manager component is any hardware, software, or combination thereof, suitably adapted to manage a pool of all resources available on the document processing device 104. Each job, or task, received by the job resource manager includes one or more resource allocation requests.

In accordance with one aspect of the present invention, the job resource manager receives a job containing one or more resource allocation requests. Each request includes the name of the resource and the quantity desired. In one particular embodiment, the resource allocation request also includes a relative order in which the client 110 intends to use these resources. In another embodiment, the order in which the client 110 intends to use these resources is advantageously calculated by the job resource manager, as discussed in greater detail below. The job resource manager then identifies the resources requested by the job and adds the request to a queue corresponding to the resource. Next, the job resource manager calculates a resource request value based on the time at which the resource is required to be available after the first resource requested by the job is to be available, as indicated by the order designated in the request. The skilled artisan will appreciate that the document processing job includes requests to one or more resources, wherein each resource is capable of being implemented in a specific order. Thus, the first resource is assigned a null value, i.e., zero value, and each additional resource in the job has a value determined from the first resource based on the order in which the resource is needed.

The job resource manager then calculates a resource release value based on the time at which the requesting job will release the resource after the first resource has been released. The calculations for the resource release value are similar to that of the request value, in that both are based on the first resource having a null, or zero, value and each resource thereafter having a value dependent upon the order in which the resource is needed for processing the job. The resource request value and the resource release value are then compared to determine if the release value is less than or equal to the request value. When the release value is greater than the request value, the request remains in its current position in the resource queue and the job manager determines if another resource is requested by the job. When the release value is less than or equal to the request value, the resource is preemptively locked for use by the requesting job. The release order corresponding to the resource is then updated reflecting the priority of that particular job. That is, the job resource manager then waits for all requested resources to become available.

Once available, the job resource manager locks these resources for use and transmits an allocation event to the requesting client 110. These resources remain assigned to the client 110 until such time as the entire job has been completed. Thus, the resources remain locked until released by the requesting client 110 for use in processing the job. Upon completion of the usage of a resource, or upon completion of the entire document processing job, the client transmits a notification to the job resource manager indicated that one or more of the allocated resources are no longer needed. The resource queue is suitably updated to reflect the completion and the job resource manager then recalculates the release values and the request values of each request in the resource queue to determine the next job for which the corresponding resource will be locked. It will be appreciated by those skilled in the art that the foregoing process is repeated for each resource requested in the job until all resources have been released for use by the requesting client. The job is then output by the document processing device 104 using those resources so requested. The preceding system will better be understood in conjunction with the preferred and alternate embodiments of the instant invention, as described in the methods below, with respect to FIGS. 2, 3, and 4.

Figure 2:
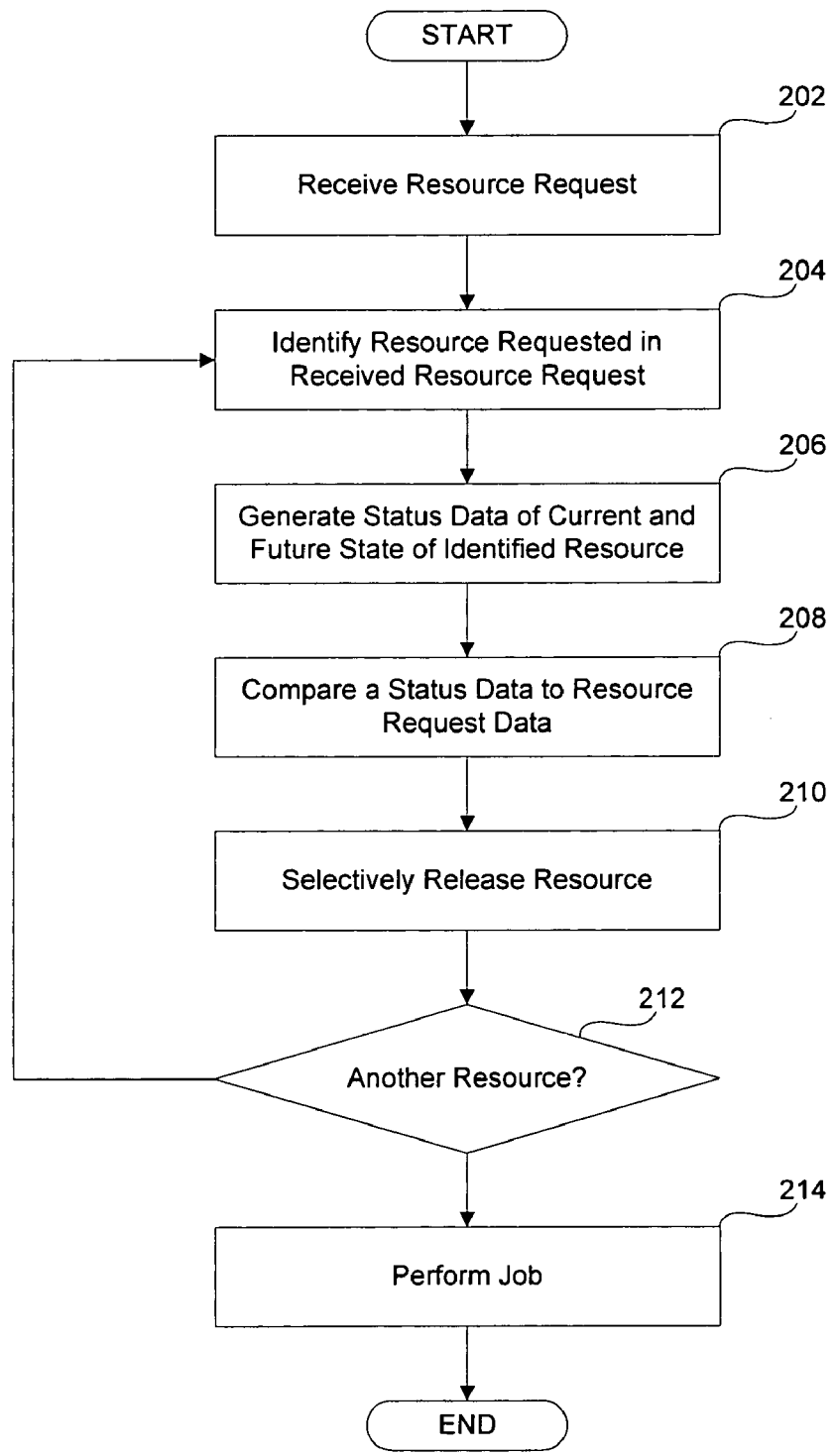
FIG. 2 is a flowchart illustrating a method for allocation of shared processing resources in accordance with the present invention.

Turning now to FIG. 2, there is shown a flowchart 200 illustrating a method for allocation of shared processing resources in accordance with the present invention. The method begins at step 202, wherein the job resource manager, resident on the controller 106 of the document processing device 104, receives a resource request. Preferably, the resource request includes an identifier associated with a desired resource and a quantity. In one embodiment of the present invention, the resource request further includes a relative order of each of the resources requested in the resource request. In another embodiment of the present invention, the relative order of each of the resources requested in the resource request is calculated by the job resource manager. At step 204, the resource requested by the resource request is identified, preferably using the resource name contained within the resource request. Status data representing the current and future state of the identified resource is then generated at step 206. At step 208, the status data is then compared to the resource request data. The resource is then selectively released to the user at step 210 based upon the outcome of the comparison performed in step 208. A determination is then made at step 212 whether an additional resource is contained within the received resource request. When an additional resource is found, flow returns to step 204, wherein the additional resource is identified and operations proceed from there. When no additional resources are contained within the resource request, flow proceeds to step 214, whereupon the document processing device 104 performs the job using the resource or resources designated by the resource request.

Figure 3:
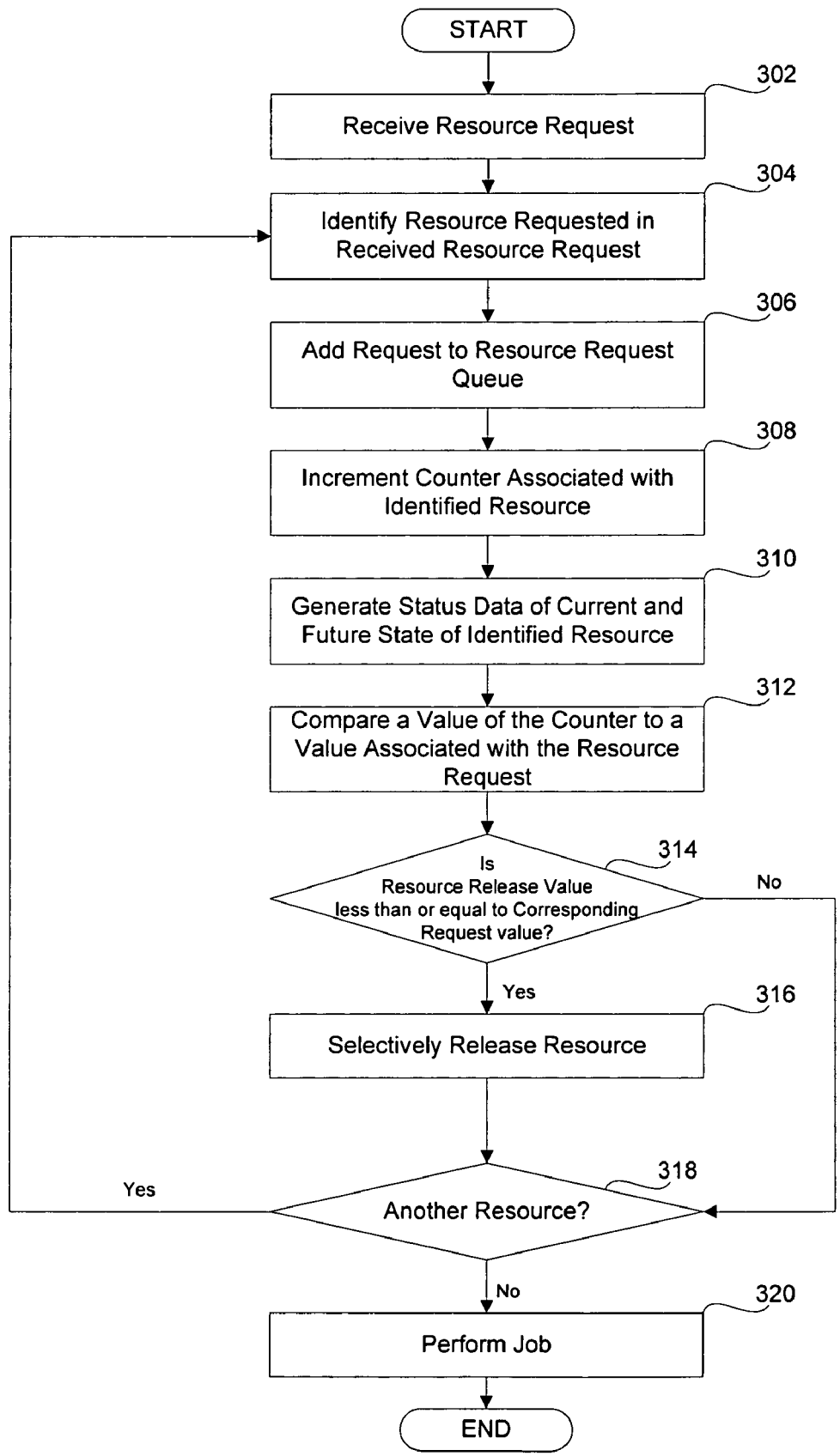
FIG. 3 is a flowchart illustrating a method for allocation of shared processing resources in accordance with the present invention.

Referring now to FIG. 3, there is shown a flowchart 300 illustrating a method for allocation of shared processing resources in accordance with one embodiment of the present invention. As depicted in FIG. 3, the method begins at step 302 with the receipt by the job resource manager, residing on the controller 106 of the document processing device 104, of a resource request. Preferably, the resource request corresponds to a request for a resource required for the completion of a document processing job. More preferably, the resource request includes data representing the name of the resource and the quantity. In one embodiment of the present invention, the resource request further includes an order in which the resource is to be used in processing the job. In accordance with another embodiment of the present invention, the relative order in which the resource is to be used in processing the job is determined via calculations conducted by the job resource manager. At step 304, the resource contained in the resource request is identified. The request is then added to a request queue associated with the resource, which contains all requests for that particular resource received by the job resource manager at step 306.

At step 308, a counter associated with the requested resource is incremented so as to reflect the addition of the new resource request. Data is then gathered at step 310 of the current and future status of the identified resource. The value of the incremented counter, i.e., the resource request value, is then compared at step 312 to a value associated with the resource request, i.e., the resource release value. A determination is then made at step 314 whether the resource release value is less than or equal to the resource request value. When the resource release value is less than or equal to the resource request value, flow proceeds to step 316, whereupon the resource is selectively released. When the release value is greater than that of the request value, the request is kept in its present position in the request queue and flow proceeds to step 318 wherein a determination is made whether any additional resources have been requested by the current job. When an additional resource has been requested, flow returns to step 304, whereupon the resource is identified and operations continue as explained above. When, however, no further resources have been requested by the job, flow proceeds to step 320, wherein the job is performed by the document processing device 104.

Figure 4:
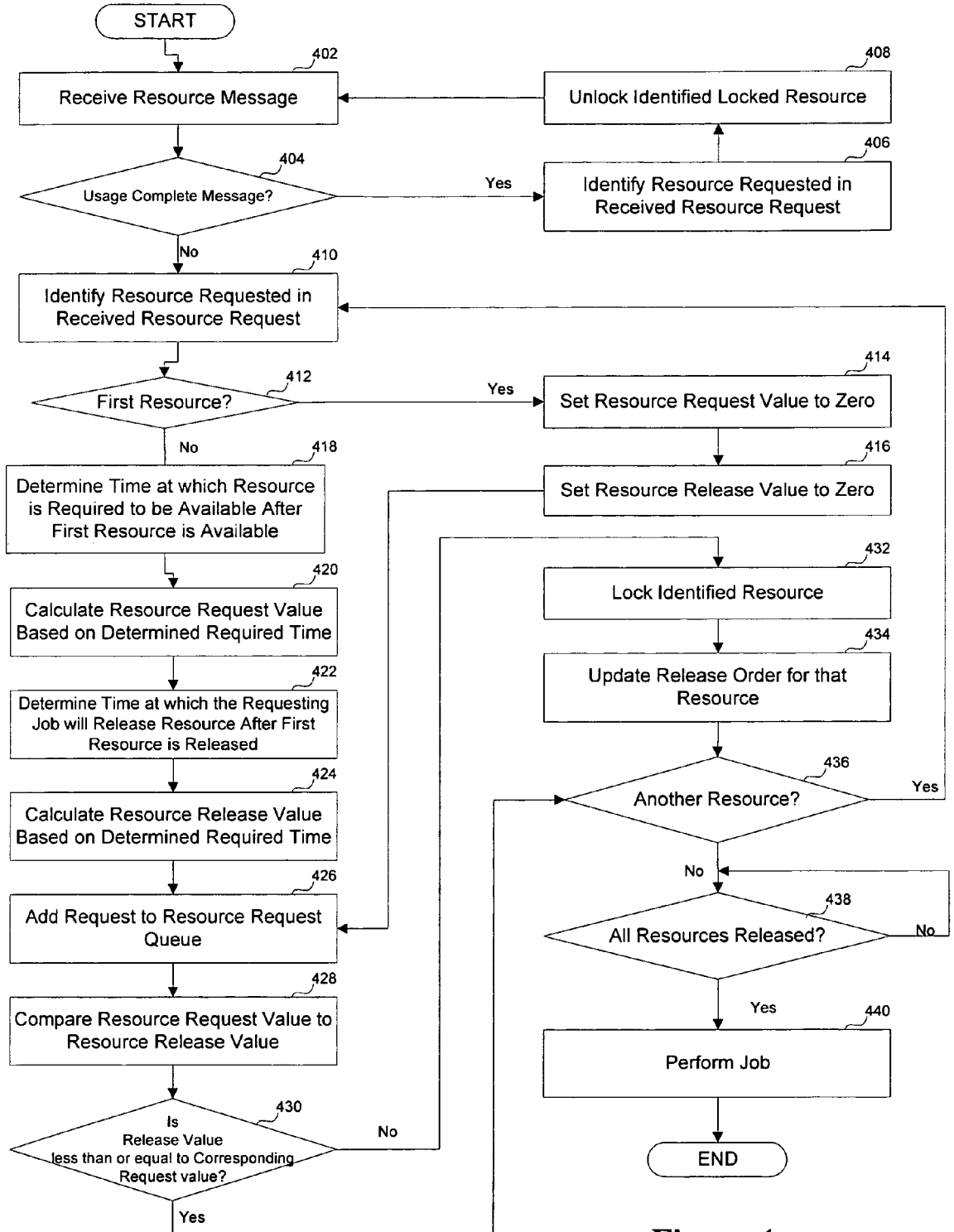
FIG. 4 is a flowchart illustrating a method for allocation of shared processing resources in accordance with the present invention.

Turning now to FIG. 4, there is shown a flowchart 400 illustrating a method for allocation of shared processing resources in accordance with one embodiment of the present invention. Operations begin at step 402 when the job resource manager receives a resource message. Preferably, the resource message comprises various data, including, without limitation, a name associated with a processing resource, and a quantity associated with a processing resource. In one embodiment, the resource message further includes a relative order associated with a processing resource, and the like. In another embodiment, the relative order associated with a processing resource is advantageously calculated by the job resource manager. Flow then proceeds to step 404, whereupon a determination is made whether the resource message received by the job resource manager is a usage completion message. The skilled artisan will appreciate that upon completion of processing of a job by a particular resource, the job advantageously reports such completion to the job resource manager. When such a completion message is received, flow proceeds to step 406, wherein the resource that is no longer needed is identified using the name associated with the resource, as contained within the resource message. The identified resource is then unlocked at step 408 and the job manager returns to step 402, wherein it waits for receipt of the next resource message.

When it is determined at step 404 that the resource message received is not a usage completion message, the job resource manager then identifies, at step 410, the resource based upon the name associated with the resource included within the resource message. A determination is then made at step 412 whether the identified resource is the first resource, i.e., whether the resource is the first resource required by the document processing job to which the resource message pertains. When the identified resource is not the first resource, flow proceeds to step 418, whereupon the time the identified resource is required to be available after the first resource is available is determined by the job resource manager. At step 420, the determined time is used by the job manager to calculate a resource request value associated with the identified resource. The time at which the requesting job will release the resource after the first resource is released is then determined by the job resource manager at step 422. The job resource manager then calculates, based upon this time, a resource release value at step 424. The resource request is then added to the request queue associated with the identified resource at step 426. Flow then proceeds to step 428, as will be explained below.

Returning to step 412, when it is determined that the identified resource is the first resource required by the associated processing job, flow proceeds to step 414, whereupon a resource request value associated with the first resource is set to a null value, i.e., zero. The resource release value associated with this first resource is also set to a null value, i.e., zero, at step 416. The first resource is then added to the request queue associated with the first resource at step 426. It will be appreciated by those skilled in the art that the first resource request is advantageously placed at the top of the queue so as to be the first resource request associated with the designated resource to be processed by that resource.

Operations then proceed to step 428, whereupon the job resource manager compares the resource request value with the resource release value, both of which are associated with the identified resource. A determination is then made at step 430 whether the release value is less than or equal to the request value. When it is determined that the release value is less than or equal to the request value, flow proceeds to step 432, whereupon the identified resource is preemptively locked. It will be appreciated by those skilled in the art that the locked resource is thereby only usable for processing by the requesting job. The release order, i.e., the order in which requests in the request queue are processed by the resource, is then updated at step 434 to indicate that the next request to be processed will be the request associated with that particular requesting job. Returning to step 430, when it is determined that the release value is not less than or equal to the request value, flow proceeds to step 434, whereupon the release order for the designated resource is updated to reflect the position of the request relative to the request queue in light of the calculated values.

Following step 434, flow proceeds to step 436, whereupon a determination is made whether the requesting job has an additional resource associated therewith. When it is determined that an additional resource is requested by the job, flow returns to step 410, wherein the additional resource is identified for further processing by the job resource manager in accordance with the steps discussed above. When no additional resources remain to be processed by the job resource manager, flow progresses to step 438, wherein a determination is made whether all resources associated with the requesting job have been released, i.e., whether all resources associated with the requesting job have been released for use to process the job. When all resources have not been released, the job resource manager waits at step 438 until such time as the requesting job releases the resources. When all resources have been released, the job is performed at step 440 and the operation terminates.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

While in the preferred embodiment the present invention is implemented in software, as those skilled in the art can readily appreciate it may also be implemented in hardware or a combination of software and hardware. Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed:

1. A system for allocation of shared processing resources comprising:

means adapted for receiving resource request data associated with completion of a document processing operation, the resource request data including resource identifier data and resource quantity data corresponding to a plurality of components of an associated document processing device required to complete the document processing operation;

means adapted for receiving resource usage data representative of relative usage order associated with a plurality of processing resources;

means adapted for assessing resource usage corresponding to at least one previously submitted document processing operation assigned to the document processing device;

monitoring means adapted for generating status data representative of present and future status of the plurality of processing resources in accordance with assessed resource usage;

comparison means adapted for generating comparison data representative of a comparison of received request data with status data;

resource locking means for locking resources of the document processing device corresponding to the resource request data in accordance with an output of the comparison means; and resource release means adapted for selectively releasing resources corresponding to received resource request data in accordance with a completion of the document processing operation.

2. The system for allocation of shared processing resources of claim 1 wherein the comparison means includes means adapted for generating the comparison data in accordance with an expected resource release timing calculated from resource request data and a resource availability timing calculated from status data.

3. The system for allocation of shared processing resources of claim 1 further comprising:

a counter associated with at least one resource;

means adapted for incrementing the counter as for each request for a resource corresponding thereto;

the comparison means includes means adapted for comparing a value of the counter to a value associated with a resource request for a resource corresponding thereto; and the resource release means includes means adapted for releasing a resource upon a determination by the comparison means that a corresponding resource release value is less than or equal to the corresponding resource request value.

4. The system for allocation of shared processing resources of claim 1 wherein the resources include document processing operations, electronic document transmission operations, and document finishing operations.

5. A method for allocation of shared processing resources comprising the steps of: receiving resource request data associated with completion of a document processing operation, the resource request data including resource identifier data and resource quantity data corresponding to a plurality of components of an associated document processing device required to complete the document processing operation;

receiving resource usage data representative of relative usage order associated with a plurality of processing resources;

assessing resource usage corresponding to at least one previously submitted document processing operation assigned to the document processing device;

generating status data representative of present and future status of the plurality of processing resources in accordance with assessed resource usage;

generating comparison data representative of a comparison of received request data with status data in accordance with assessed resource usage;

locking resources of the document processing of the document processing device corresponding to the resource request data in accordance with an output of the comparison data; and selectively releasing resources corresponding to received resource request data in accordance with a completion of the document processing operation.

6. The method for allocation of shared processing resources of claim 5 wherein the step of generating comparison data further comprises generating the comparison data in accordance with an expected resource release timing calculated from resource request data and a resource availability timing calculated from status data.

7. The method for allocation of shared processing resources of claim 5 further comprising:

incrementing a counter associated with at least one resource as for each request for a resource corresponding thereto;

comparing a value of the counter to a value associated with a resource request for a resource corresponding thereto; and releasing a resource upon a determination by the comparison means that a corresponding resource release value is less than or equal to the corresponding resource request value.

8. The method for allocation of shared processing resources of claim 5 wherein the resources include document processing operations, electronic document transmission operations, and document finishing operations.

9. A computer-readable medium of instructions having computer-readable instructions stored thereon for allocation of shared processing resources comprising the steps of:

instructions for receiving resource request data associated with completion of a document processing operation, the resource request data including resource identifier data and resource quantity data corresponding to a plurality of components of an associated document processing device required to complete the document processing operation;

instructions for receiving resource usage data representative of relative usage order associated with a plurality of processing resources;

instructions for assessing resource usage corresponding to at least one previously submitted document processing operation assigned to the document processing device;

instructions for generating status data representative of present and future status of the plurality of processing resources in accordance with assessed resource usage;

instructions for generating comparison data representative of a comparison of received request data with status data;

instructions for locking resources of the document processing device corresponding to the resource request data in accordance with an output of the comparison data; and instructions for selectively releasing resources corresponding to received resource request data in accordance with a completion of the document processing operation.

10. The computer-readable medium of instructions having computer-readable instructions stored thereon for allocation of shared processing resources of claim 9 wherein the instructions for generating comparison data further comprises instructions for generating the comparison data in accordance with an expected resource release timing calculated from resource request data and a resource availability timing calculated from status data.

11. The computer-readable medium of instructions having computer-readable instructions stored thereon for allocation of shared processing resources of claim 9 further comprising:

instructions for incrementing a counter associated with at least one resource as for each request for a resource corresponding thereto;

instructions for comparing a value of the counter to a value associated with a resource request for a resource corresponding thereto; and instructions for releasing a resource upon a determination by the comparison means that a corresponding resource release value is less than or equal to the corresponding resource request value.

12. A computer-implemented method for allocation of shared processing resources comprising the steps of:

receiving resource request data associated with completion of a document processing operation, the resource request data including resource identifier data and resource quantity data corresponding to a plurality of components of an associated document processing device required to complete the document processing operation;

receiving resource usage data representative of relative usage order associated with a plurality of processing resources;

assessing resource usage corresponding to at least one previously submitted document processing operation assigned to the document processing device;

generating status data representative of present and future status of the plurality of processing resources in accordance with assessed resource usage;

generating comparison data representative of a comparison of received request data with status data;

locking resources of the document processing device corresponding to the resource request data in accordance with an output of the comparison data; and selectively releasing resources corresponding to received resource request data in accordance with a completion of the document processing operation.

13. The computer-implemented method for allocation of shared processing resources of claim 12 wherein the step of generating comparison data further comprises generating the comparison data in accordance with an expected resource release timing calculated from resource request data and a resource availability timing calculated from status data.

14. The computer-implemented method for allocation of shared processing resources of claim 12 further comprising:

incrementing a counter associated with at least one resource as for each request for a resource corresponding thereto;

comparing a value of the counter to a value associated with a resource request for a resource corresponding thereto; and releasing a resource upon a determination by the comparison means that a corresponding resource release value is less than or equal to the corresponding resource request value.

* * * * *